United States Patent
Tanaka et al.

[11] Patent Number: 6,057,626
[45] Date of Patent: May 2, 2000

[54] COMMUTATOR FOR A DYNAMO-ELECTRIC MACHINE AND METHOD OF MANUFACTURE THEREFOR

[75] Inventors: Toshinori Tanaka; Ryuichi Ikeda; Akihiro Daikoku; Yuji Nakahara; Nobuaki Miyake; Kyouhei Yamamoto, all of Tokyo, Japan

[73] Assignee: Mitsubishi Denki Kabushiki Kaisha, Tokyo, Japan

[21] Appl. No.: 09/368,419

[22] Filed: Aug. 5, 1999

[30] Foreign Application Priority Data

Aug. 10, 1998 [JP] Japan .................................. 10-226316

[51] Int. Cl.[7] .................................................. H02K 39/08
[52] U.S. Cl. ........................ 310/233; 310/235; 310/236; 310/43; 310/204; 29/597
[58] Field of Search .................................. 310/235, 236, 310/234, 233, 205, 204, 43; 29/597, 596, 598

[56] References Cited

U.S. PATENT DOCUMENTS

| | | | |
|---|---|---|---|
| 3,717,928 | 2/1973 | Yamaguchi | 29/597 |
| 3,790,835 | 2/1974 | Takeda | 310/268 |
| 4,710,662 | 12/1987 | Balke et al. | 310/204 |
| 5,760,518 | 6/1998 | Abe et al. | 310/237 |
| 5,793,140 | 8/1998 | Tuckey | 310/237 |
| 5,925,961 | 7/1999 | Sugiyanma | 310/237 |
| 5,932,949 | 8/1999 | Ziegler et al. | 310/236 |

FOREIGN PATENT DOCUMENTS

| | | |
|---|---|---|
| 56-149565 | 4/1955 | Japan . |
| 59-86847 | 6/1984 | Japan . |
| 60-162451 | 8/1985 | Japan . |
| 52-156306 | 12/1997 | Japan . |

Primary Examiner—Clayton LaBalle
Attorney, Agent, or Firm—Sughrue, Mion, Zinn, Macpeak & Seas, PLLC

[57] ABSTRACT

A commutator for a dynamo-electric machine according to the present invention comprises a cylindrical commutator main body provided with a plurality of commutator segments disposed around the circumference thereof, an equalizer assembly disposed inside the commutator main body provided with equalizer segments electrically connecting commutator segments which are to have the same electric potential, and an insulating resin portion disposed within the space inside the commutator main body integrating the commutator main body and the equalizer assembly.

11 Claims, 15 Drawing Sheets

COMMUTATOR FOR A DYNAMO-ELECTRIC MACHINE AND METHOD OF MANUFACTURE THEREFOR

BACKGROUND OF THE INVENTION

1. Field of the Invention

The present invention relates to a commutator for a dynamo-electric machine comprising equalizer segments electrically connecting commutator segments which are to have the same electric potential, and to a method of manufacturer therefor.

2. Description of the Related Art

FIG. 26 is a partial cross-section of an electric motor which is a conventional dynamo-electric machine. In the electric motor, a commutator assembly 2 is disposed in the vicinity of an armature 1.

The armature 1 comprises a core 3 having a plurality of slots extending longitudinally, and windings 4 composed of wire wound into the slots by a lap-winding method.

The commutator assembly 2 comprises a commutator 8 and brushes (not shown) contacting the surface of the commutator 8. The commutator 8 comprises a plurality of commutator segments 5 disposed around the circumference thereof having risers 6 electrically connected to the windings 4, an insulating resin portion 7 securing the commutator segments 5, and equalizers 9 electrically connecting commutator segments 5 which are to have the same electric potential. The equalizers 9 comprises a plurality of equalizer segments 11 like the one shown in FIG. 27, the tips 10 thereof being secured to the risers 6 by brazing or the like. The equalizer segments 11 are secured and supported by securing members 12, and the equalizer segments 11 are designed to be able to resist centrifugal force with the assistance of the securing members 12.

In the above 4-pole, lap-wound electric motor, by supplying electric current to the windings 4 from outside by means of the brushes contacting the commutator segments 5, the armature 1 and commutator 8 which are secured to a rotor shaft (not shown) rotate together with the rotor shaft due to electromagnetic effects.

In a commutator 8 for an electric motor of the above construction, the equalizers 9 are provided to prevent the generation of circulating currents running through the brushes due to differences in induced voltage between circuits of the windings 4, but one problem has been that these equalizers 9 require the securing members 12 for support, increasing the number of parts.

A further problem has been that the equalizers 9 have been disposed separately from the commutator segments 5, necessitating the procuration of space for the equalizers 9, making the size of the commutator assembly that much larger.

SUMMARY OF THE INVENTION

The present invention aims to solve the above problems and an object of the present invention is to provide a commutator for a dynamo-electric machine capable of enabling reductions in size and in the number of parts.

To this end, according to the present invention, there is provided a commutator for a dynamo-electric machine comprising: a cylindrical commutator main body provided with a plurality of commutator segments disposed around the circumference thereof; an equalizer assembly disposed inside the commutator main body provided with at least one equalizer segments electrically connecting commutator segments which are to have the same electric potential; and an insulating resin portion disposed within the space inside the commutator main body integrating the commutator main body and the equalizer assembly.

According to another aspect of the present invention, there is provided a method of manufacturing a commutator for a dynamo-electric machine comprising a cylindrical commutator main body provided with a plurality of commutator segments disposed around the circumference thereof, an equalizer assembly disposed inside the commutator main body provided with equalizer segments electrically connecting commutator segments which are to have the same electric potential, and an insulating resin portion disposed within the space inside the commutator main body integrating the commutator main body and the equalizer assembly, the method of manufacturing comprising: a step of forming an equalizer main body by integrating a plurality of the equalizer segments in advance in a premolded portion composed of insulating resin; a step of inserting the equalizer main body inside a cylindrical drum body; a step of filling the space between the drum body and the equalizer main body with insulating resin; and a step of forming a plurality of commutator segments by making longitudinal cuts at an even pitch around the circumference of the drum body.

DETAILED DESCRIPTION OF THE PREFERRED EMBODIMENTS

Embodiment 1

Figure 1:
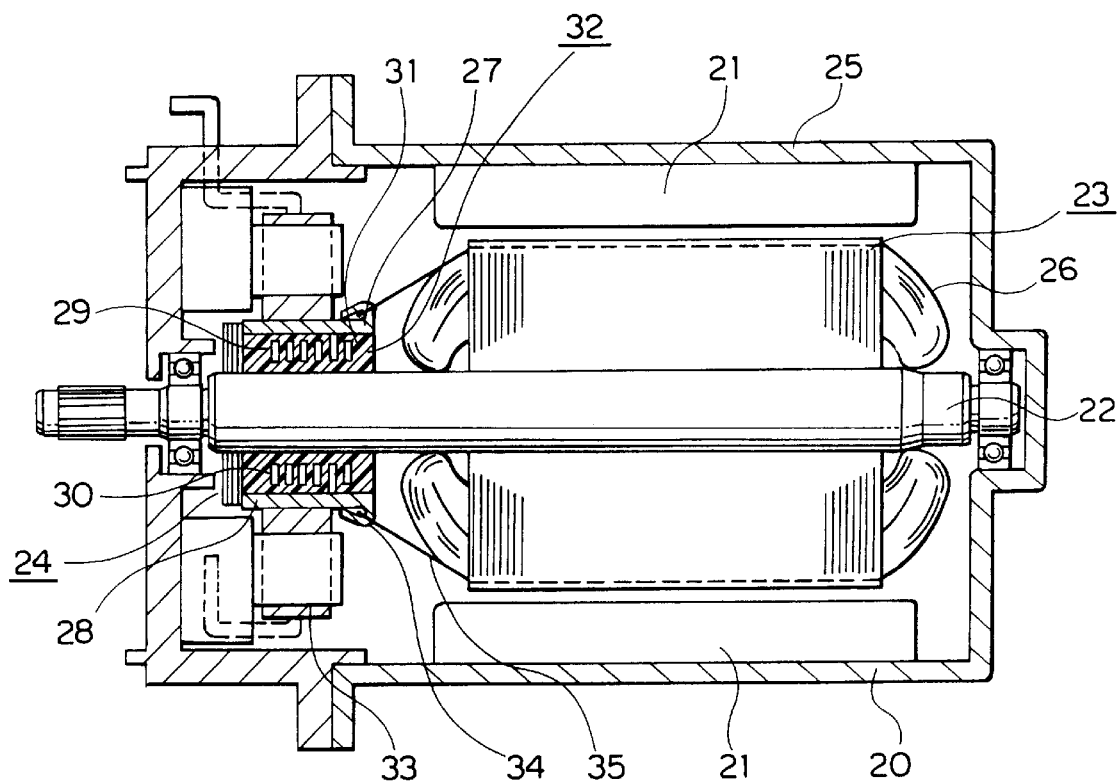
FIG. 1 is an internal cross-section of an electric motor including a commutator according to Embodiment 1 of the present invention.
Figure 2:
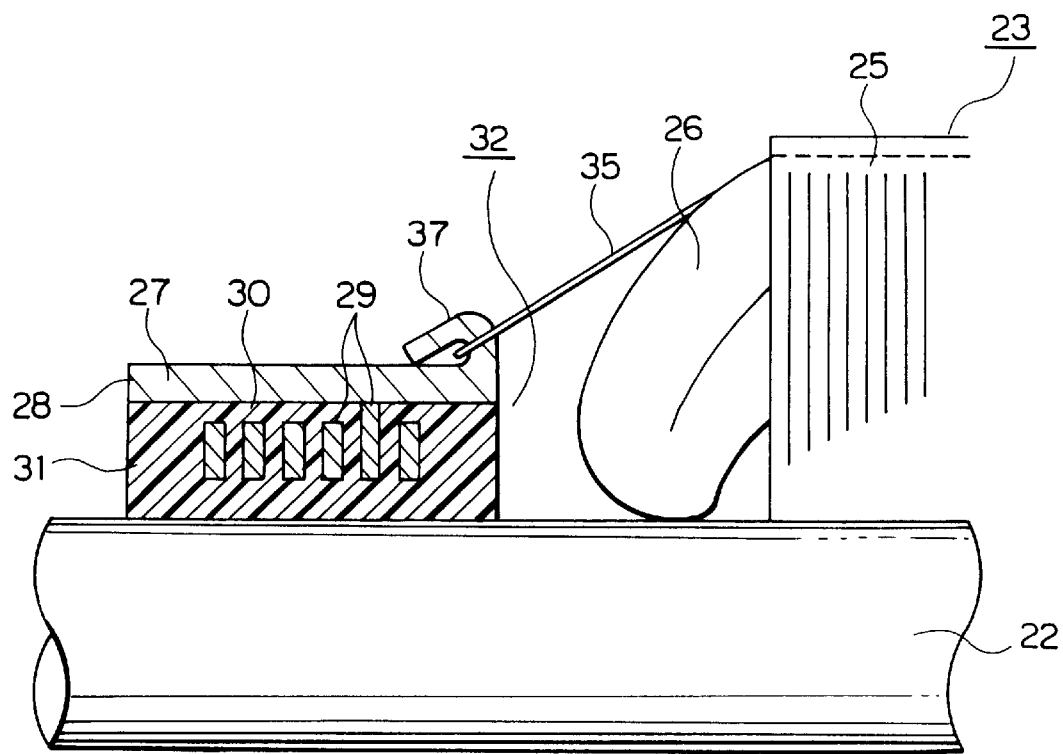
FIG. 2 is a partial enlargement of FIG. 1.
Figure 3:
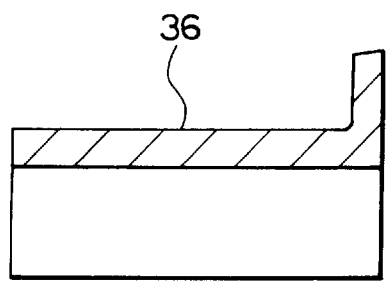
FIG. 3 is a partial cross-section of the commutator in FIG. 1 during manufacture.
Figure 4:
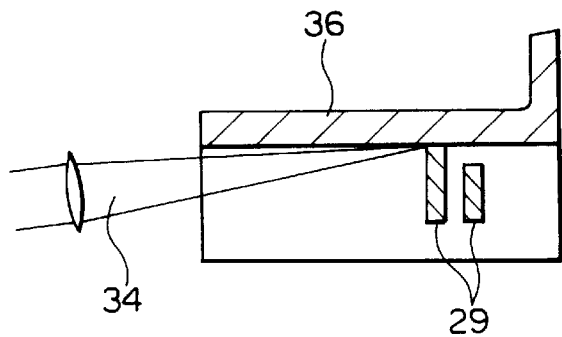
FIG. 4 is a partial cross-section of the commutator in FIG. 1 during manufacture.
Figure 5:
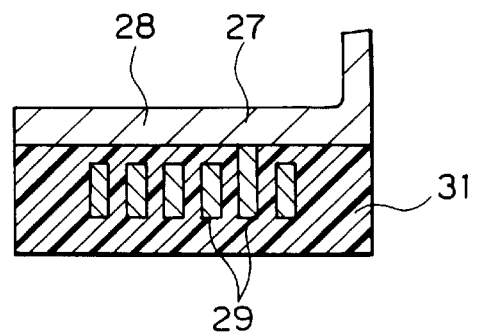
FIG. 5 is a partial cross-section of the commutator in FIG. 1 during manufacture.
Figure 6:
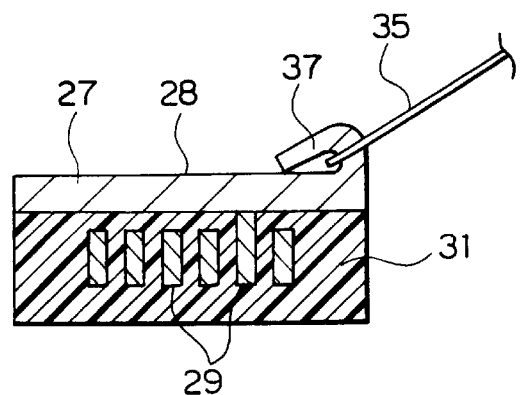
FIG. 6 is a partial cross-section of the commutator in FIG. 1 on completion of manufacture.
Figure 7:
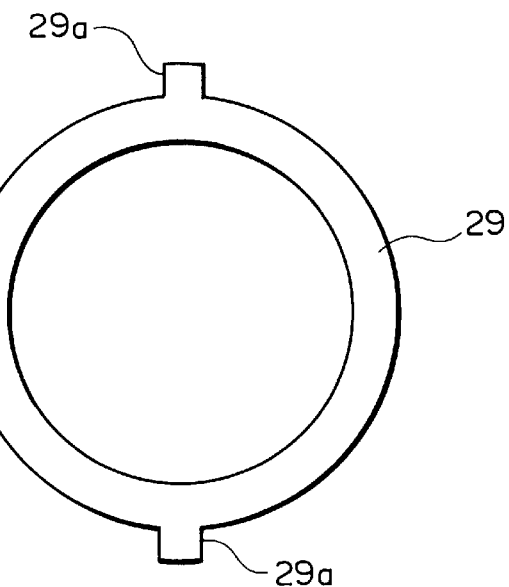
FIG. 7 is a front elevation of an equalizer segment from FIG. 1.

FIG. 1 is a longitudinal section of an electric motor including a commutator according to Embodiment 1 of the present invention and FIG. 2 is a partial enlargement of FIG. 1

The electric motor comprises: a yoke 20; permanent magnets secured to the inner wall of the yoke 20; a shaft 22 disposed so as to rotate freely within the yoke 20; an armature 23 secured to the shaft 22; and a commutator assembly 24 disposed at one end of the armature 23 and secured to the shaft 22.

The armature 23 comprises a core 25 having a plurality of slots extending longitudinally, and windings 26 composed of wire 35 wound into the slots by a lap-winding method.

The commutator assembly 24 comprises a commutator 32, and brushes 33 contacting the surface of the commutator 32. The commutator 32 comprises a commutator main body 28 comprising a plurality of commutator segments 27 disposed around the circumference thereof electrically connected to the windings 26, an equalizer assembly 30 comprising a plurality of equalizer segments 29 disposed inside the commutator main body 28, and an insulating resin portion 31 filling the space within the commutator main body 28. The equalizer segments 29 are made of iron and electrically connect commutator segments 27 made of copper which are to have the same electric potential.

In the above 4-pole, lap-wound electric motor, by supplying electric current to the windings 26 from outside by means of the brushes 33 contacting the commutator segments 27, the armature 23 and the commutator 32 which are secured to a shaft 22 rotate together with the shaft 22 due to electromagnetic effects.

FIGS. 3 to 6 are partial cross-sections showing the manufacturing process for the commutator 32. First, the equalizer segments 29 are arranged on the inner wall of a cylindrical drum body 36, and after the equalizer segments 29 are secured to prescribed portions of the inner wall of the drum body 36 using a laser 34 being a securing means, the inside of the drum body 36 is filled with insulating resin to form the insulating resin portion 31 within the drum body 36. After that, longitudinal cuts are made with even pitch around the circumference of the drum body 36 to form a plurality of commutator segments 27. Lastly, hooks 37 on the commutator segments 27 are bent over, and the commutator segments 27 and the windings 35 are electrically connected.

Figure 8:
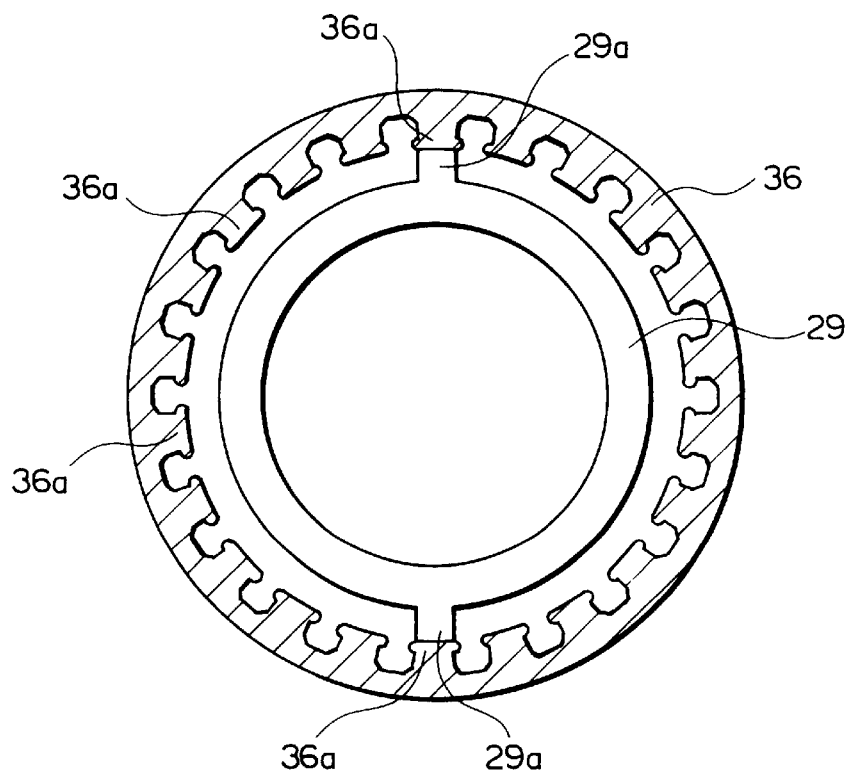
FIG. 8 is a cross-section of the commutator in FIG. 1 during manufacture.
Figure 9:
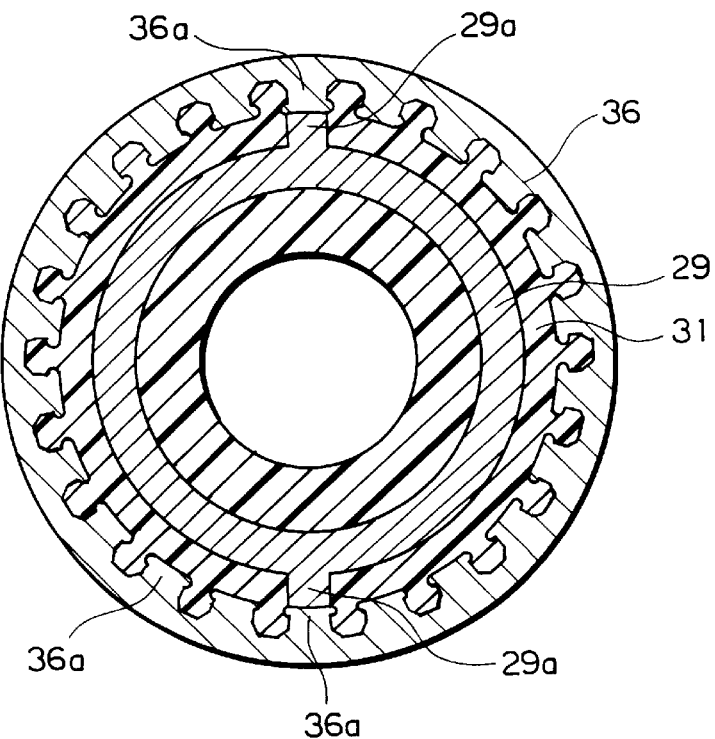
FIG. 9 is a cross-section of the commutator in FIG. 1 during manufacture.
Figure 10:
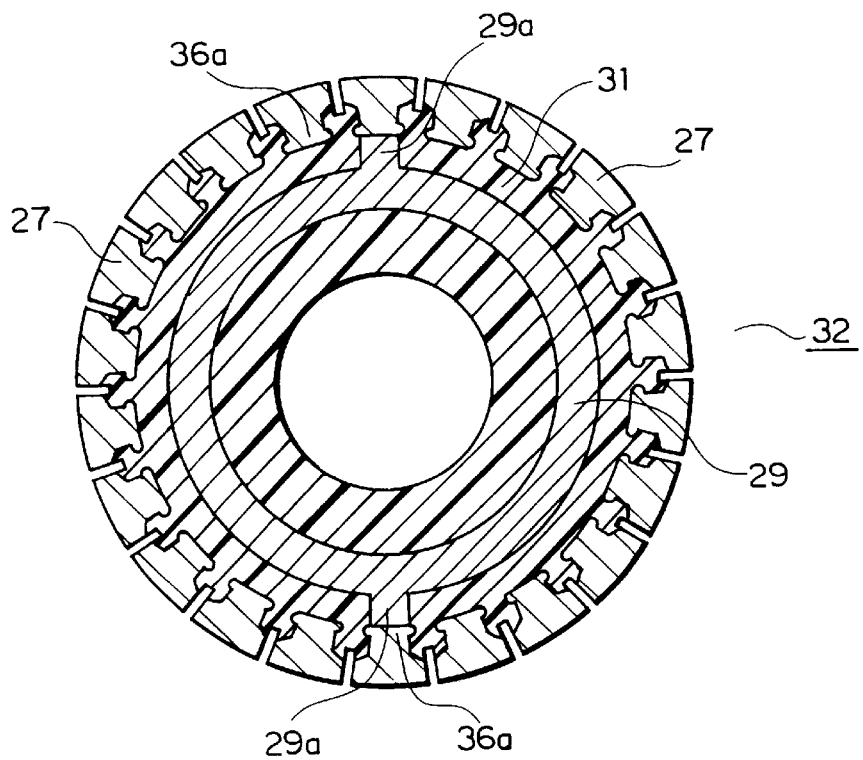
FIG. 10 is a cross-section of the commutator in FIG. 1 during manufacture.

FIGS. 7 to 10 show each of the steps in the manufacture of the commutator 32. FIG. 8 is a diagram showing a pair of protrusions 29a formed on a ring-shaped equalizer segment 29 welded to predetermined teeth 36a of the drum body 36 (corresponds to FIG. 4). FIG. 9 is a diagram showing the insulating resin portion 31 formed by filling the space within the drum body 36 with insulating resin by means of insertion molding (corresponds to FIG. 5). FIG. 10 is a diagram showing the plurality of commutator segments 27 formed by making longitudinal cuts with even pitch around the circumference of the drum body 36 (corresponds to FIG. 6).

In a commutator 32 for an electric motor of the above construction, the equalizer assembly 30 is disposed inside the commutator main body 28, making the commutator assembly compact, and is reliably secured by means of the insulating resin portion, providing a reliable electrical connection between commutator segments 27 which are to have the same electric potential.

Moreover, this embodiment has been explained with reference to an example secured by laser welding, but other securing means may be used, such as brazing, conductive resin, etc., or these may be used in combination. In such cases, the material of the equalizer segments is not limited to iron, and copper, etc., may be used.

Embodiment 2

Figure 11:
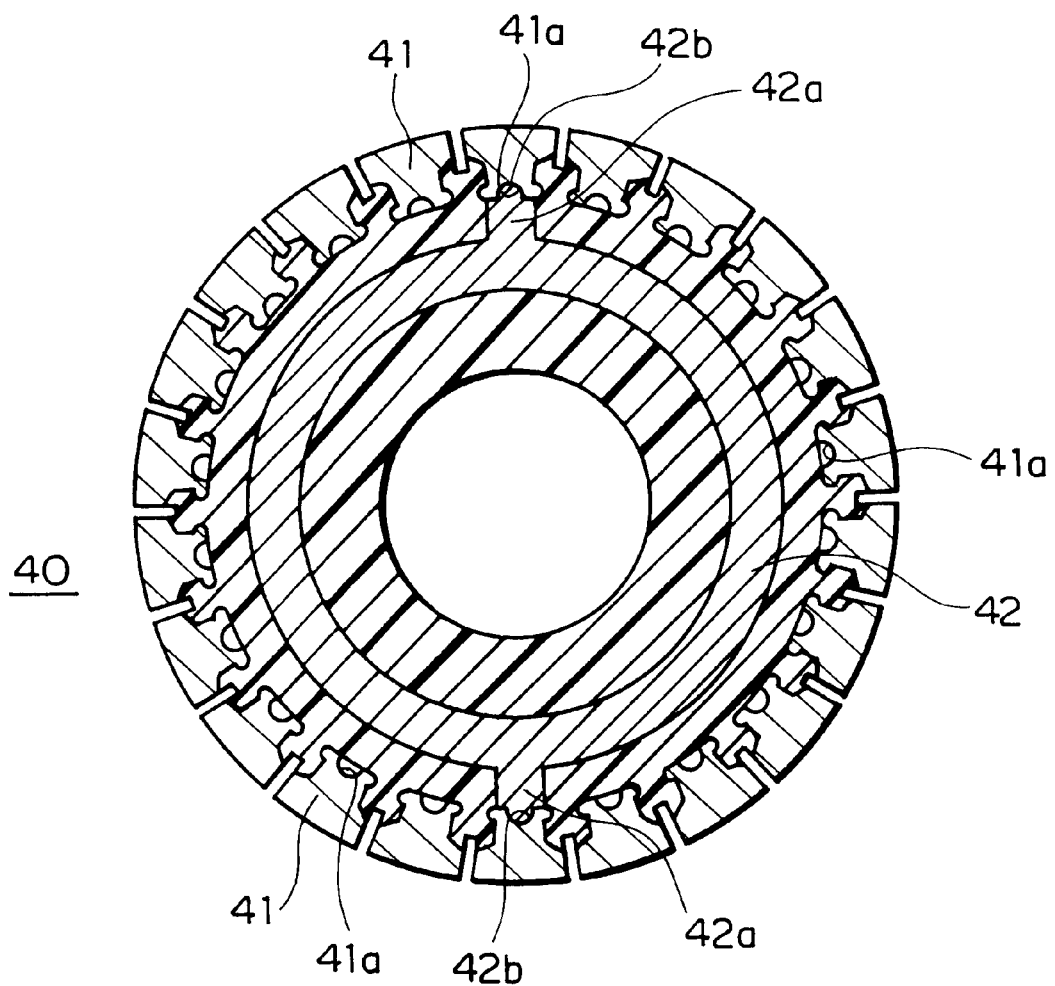
FIG. 11 is a cross-section of a commutator according to Embodiment 2 of the present invention.

FIG. 11 is a cross-section of a commutator 40 according to Embodiment 2 of the present invention. Moreover, portions the same as or corresponding to each other in each of the following embodiments will be explained using the same numbering as Embodiment 1.

In this embodiment, concave portions 41a being engaged receiving portions are formed in the inner wall of commutator segments 41 of the commutator 40. Convex portions 42b being engaging portions or positioning members are formed on the ends of protrusions 42a of equalizer segments 42. Because the convex portions 42b are engaged in the concave portions 41a, the equalizer segments 42 are reliably positioned circumferentially relative to the commutator segments 41, providing reliable electrical connection between commutator segments 41 which are to have the same electric potential without short-circuiting between the equalizer segments 42 as well as improving the assembly operation.

Embodiment 3

Figure 12:
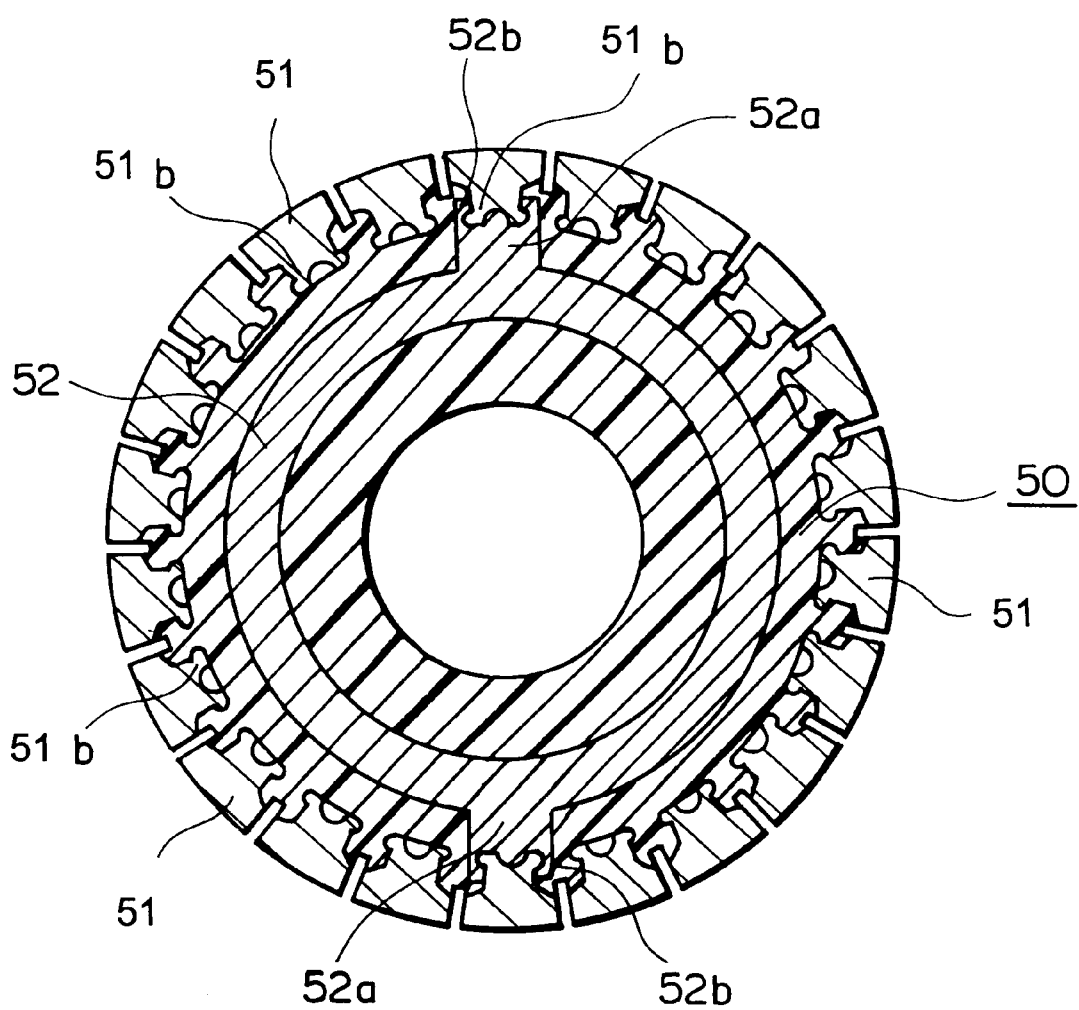
FIG. 12 is a cross-section of a commutator according to Embodiment 3 of the present invention.

FIG. 12 is a cross-section of a commutator 50 according to Embodiment 3 of the present invention. In this embodiment, clasped portions 51b are formed on the roots of commutator segments 51 of the commutator 50. Clasping portions 52b are formed on the protrusions 52a of equalizer segments 52. Because the clasping portions 52b clasp the clasped portions 51b of the commutator segments 51 and hold each of the commutator segments 51, the commutator segments 51 are more reliably prevented from jumping out due to centrifugal force during rotation.

Embodiment 4

Figure 13:
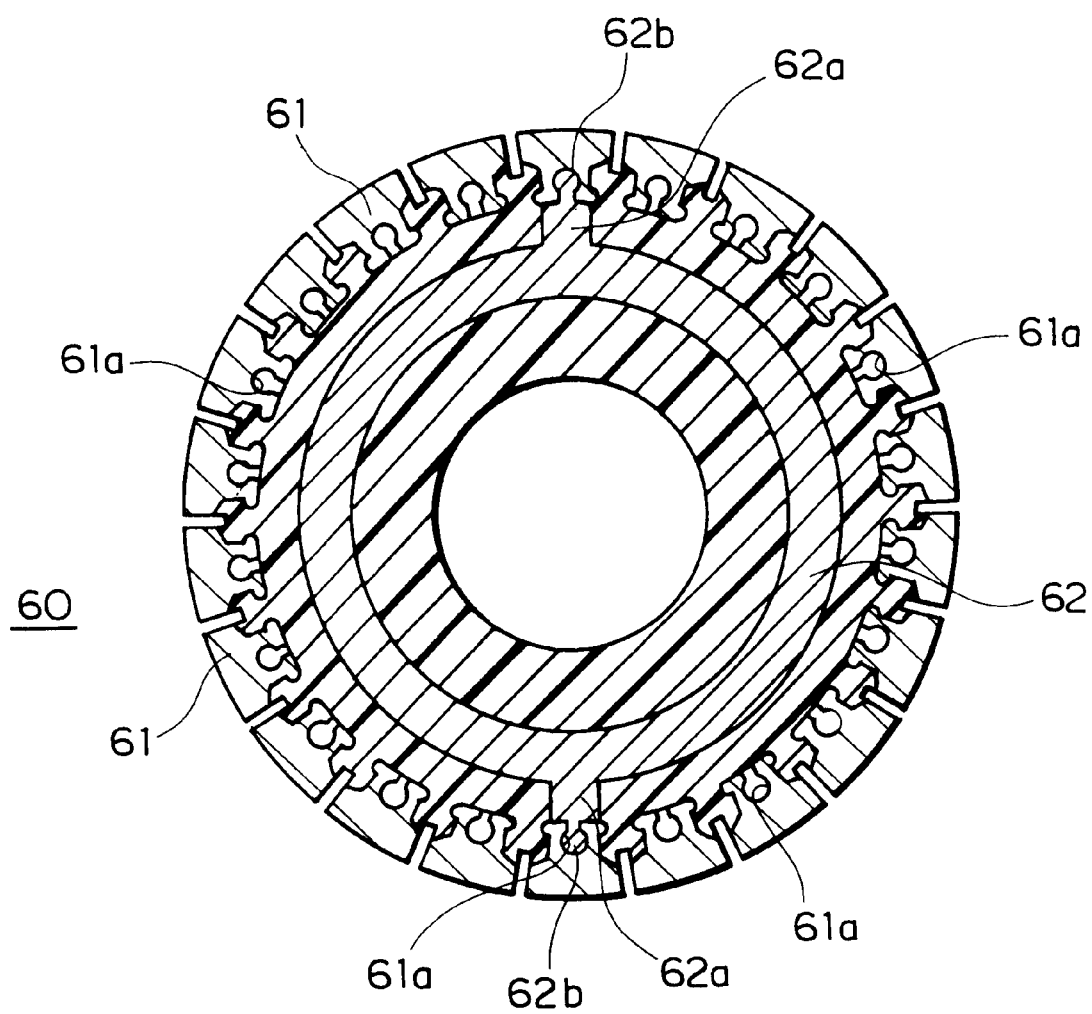
FIG. 13 is a cross-section of a commutator according to Embodiment 4 of the present invention.
Figure 14:
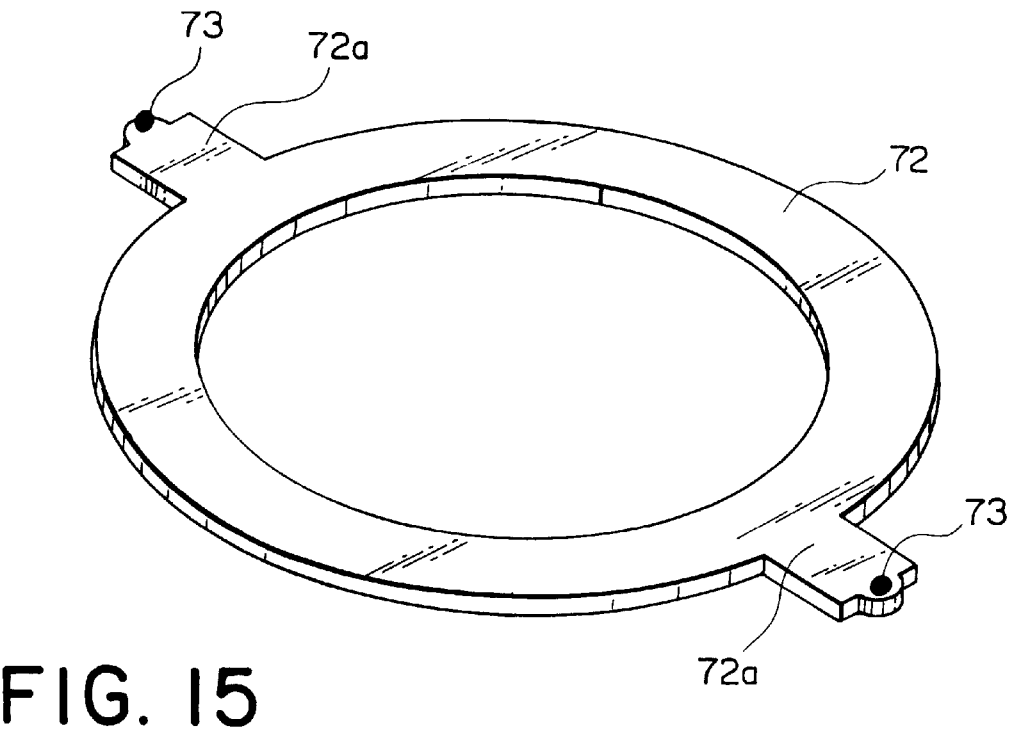
FIG. 14 is a perspective of an equalizer segment of a commutator according to Embodiment 5 of the present invention.
Figure 15:
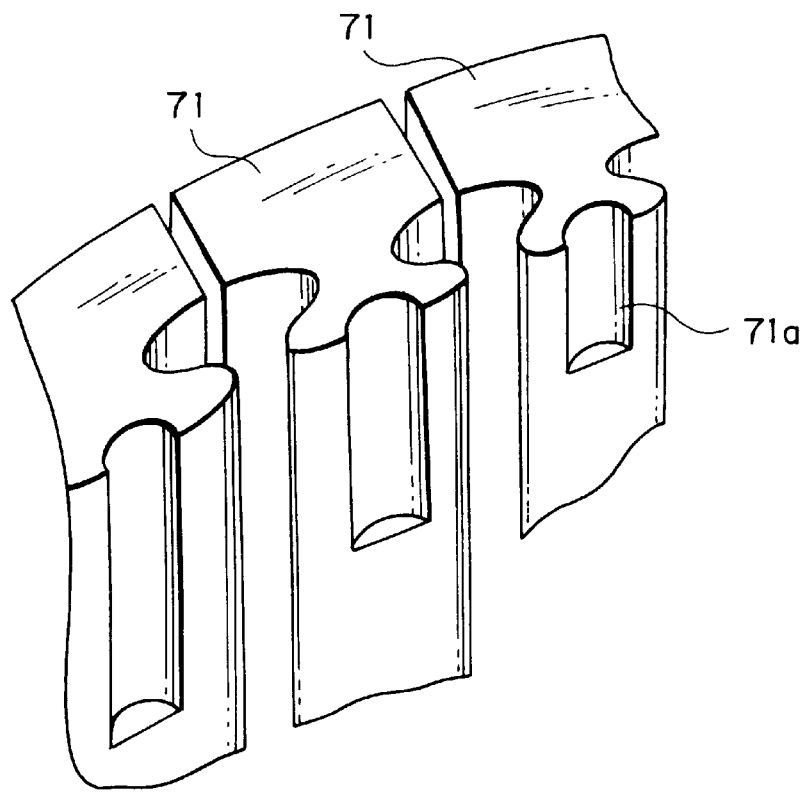
FIG. 15 is a partial perspective of commutator segments of the commutator according to Embodiment 5 of the present invention.
Figure 16:
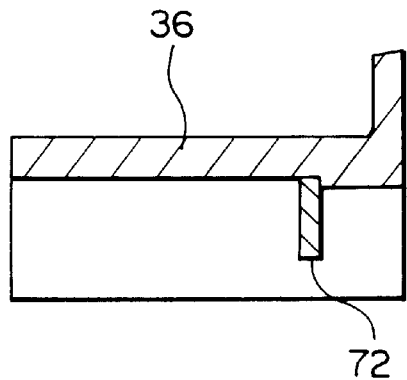
FIG. 16 is a partial cross-section of the commutator according to Embodiment 5 of the present invention during manufacture.
Figure 17:
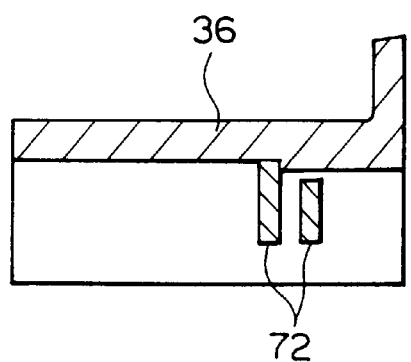
FIG. 17 is a partial cross-section of the commutator according to Embodiment 5 of the present invention during manufacture.
Figure 18:
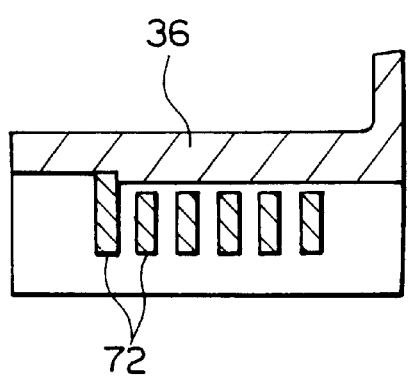
FIG. 18 is a partial cross-section of the commutator according to Embodiment 5 of the present invention during manufacture.
Figure 19:
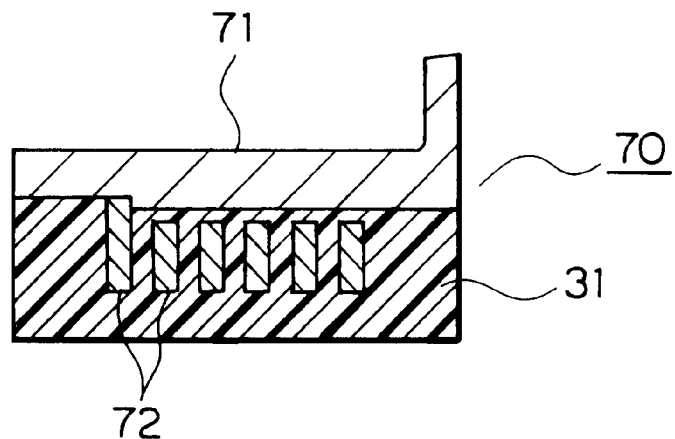
FIG. 19 is a partial cross-section of the commutator according to Embodiment 5 of the present invention on completion of manufacture.

FIG. 13 is a cross-section of a commutator 60 according to Embodiment 4 of the present invention. In this embodiment, clasping portions 61a are formed on the roots of commutator segments 61 of the commutator 60. Clasped portions 62b are formed on the protrusions 62a of equalizer segments 62. Because the clasping portions 61a of the commutator segments 61 clasp the clasped portions 62b and hold each of the commutator segments 61, the commutator segments 61 are more reliably prevented from jumping out due to centrifugal force during rotation.

Embodiment 5

FIGS. 14 to 19 show Embodiment 5 of the present invention. Grooves 71a each differing in length from the end surface in the longitudinal direction are formed in the inner wall of each of the commutator segments 71. For that reason, predetermined spacing between the equalizer segments 72 is reliable ensured.

The manufacturing process for this commutator 70 is the same as that described for Embodiment 1, but in this example conductive resin is used as the securing means instead of a laser. That is to say, thermosetting conductive resin 73 is disposed on the protrusions 72a of the equalizer segments 72 and the protrusions 72a of the equalizer segments 72 are bonded to the longitudinally bottom surfaces of the grooves 71a by heating them after insertion. FIGS. 16 to 19 are diagrams indicating the steps in that process, and explanation thereof will be omitted. Of course, laser welding or brazing can be also used as the securing means.

Embodiment 6

Figure 20:
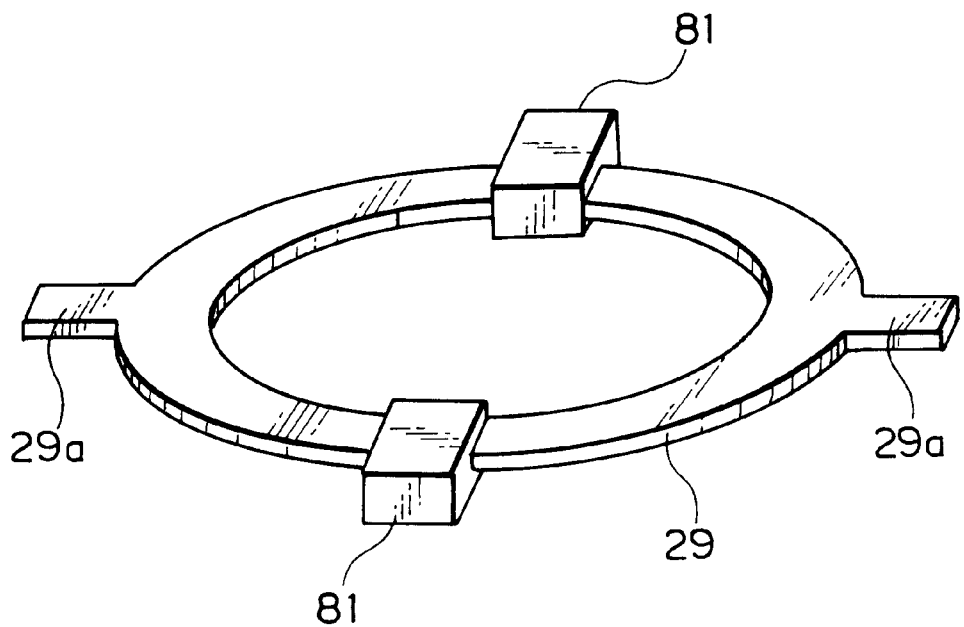
FIG. 20 is a perspective of an equalizer segment of a commutator according to Embodiment 6 of the present invention.

FIG. 20 is a perspective of an equalizer segment of a commutator according to Embodiment 6 of the present invention. In this embodiment, because the equalizer segments are provided with spacers 81 composed of insulating material for ensuring spacing from adjacent equalizer segments 29 or spacing from commutator segments other than the commutator segments to be connected, short-circuiting between adjacent equalizer segments 29 or between equalizer segments 29 and commutator segments other than the commutator segments to be connected is reliably prevented.

Embodiment 7

Figure 21:
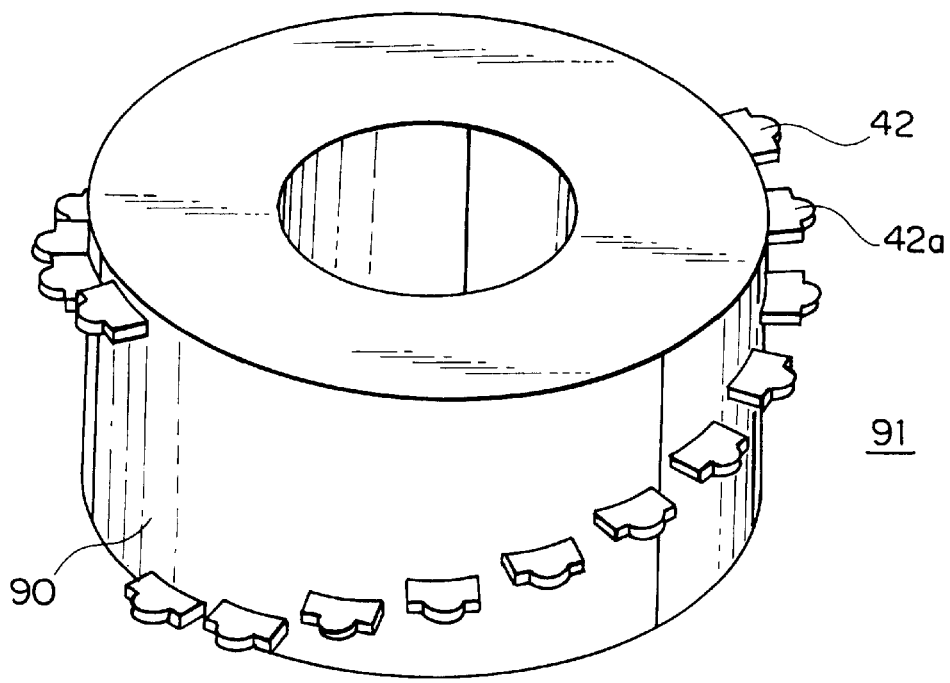
FIG. 21 is a perspective of an equalizer main body of a commutator according to Embodiment 7 of the present invention during manufacture.

FIG. 21 is a diagram showing Embodiment 7 during manufacture. In this embodiment, a plurality of equalizer segments 42 are integrated in advance by a premolded portion 90 to form an equalizer main body 91. This equalizer main body 91 is then inserted inside the cylindrical drum body 36, the space between the drum body 36 and the equalizer main body 91 is filled with insulating resin, and lastly the commutator segments 41 are formed by making longitudinal cuts with even pitch around the circumference of the drum body 36 to form the commutator 40.

In this embodiment, the equalizer segments 42 are easily positioned relative to the commutator segments 41.

Embodiment 8

Figure 22:
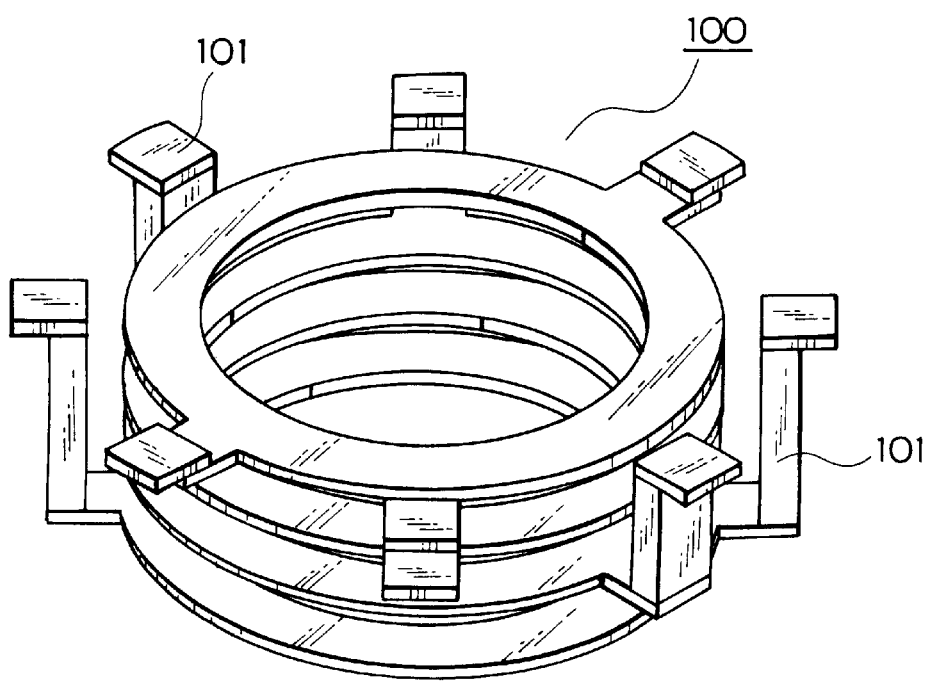
FIG. 22 is a perspective of an equalizer assembly of a commutator according to Embodiment 8 of the present invention.
Figure 23:
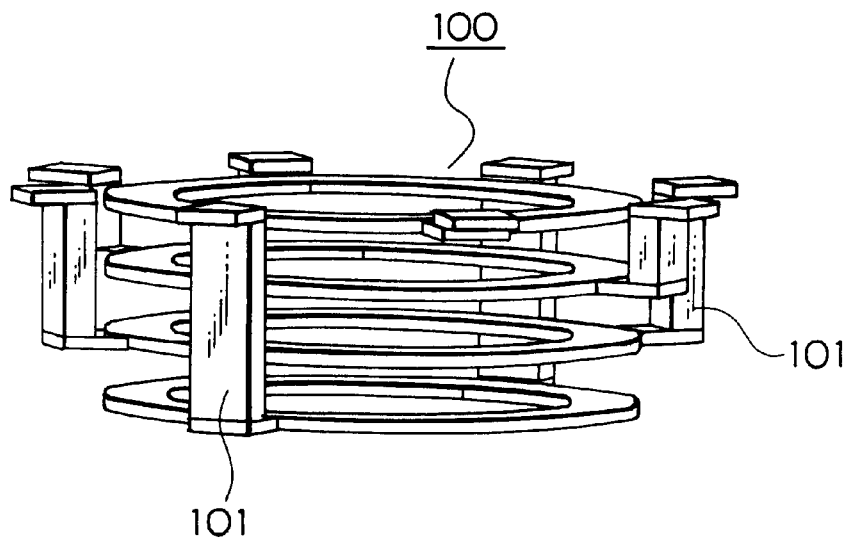
FIG. 23 is a perspective of the equalizer assembly of the commutator according to Embodiment 8 of the present invention.

FIGS. 22 and 23 are perspectives of an equalizer assembly 100 of a commutator according to Embodiment 8 of the present invention. In this embodiment, because the connecting portions between the commutator segments 27 and equalizer segments 101 are all at the same distance from the end surface of the commutator segments 27, the position for welding the commutator segments 27 and the equalizer segments 101, for example, is constant, allowing the welding device to be simplified.

Embodiment 9

Figure 24:
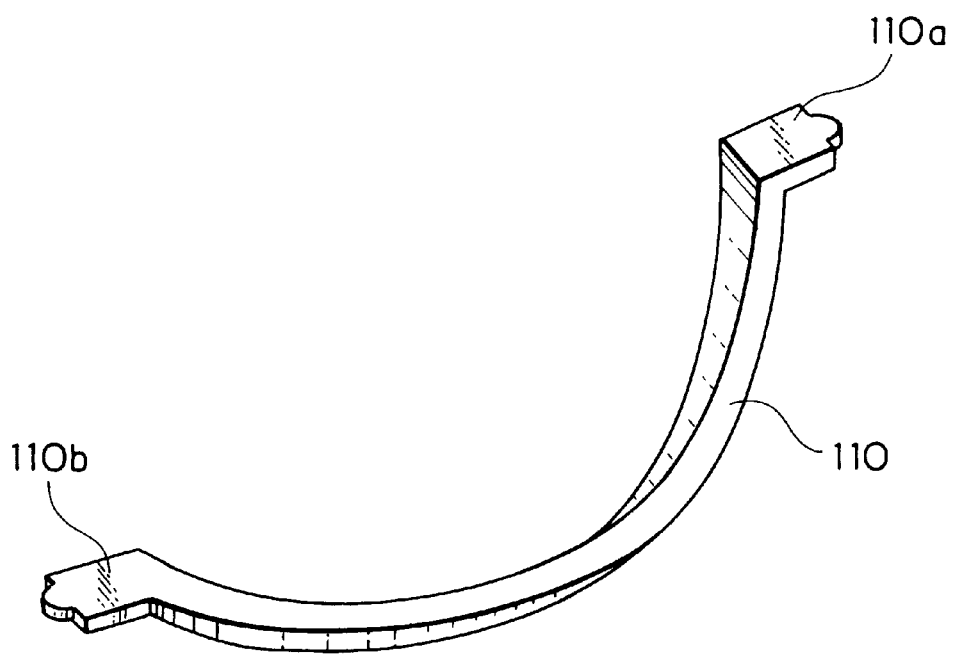
FIG. 24 is a perspective of an equalizer segment of a commutator according to Embodiment 9 of the present invention.
Figure 25:
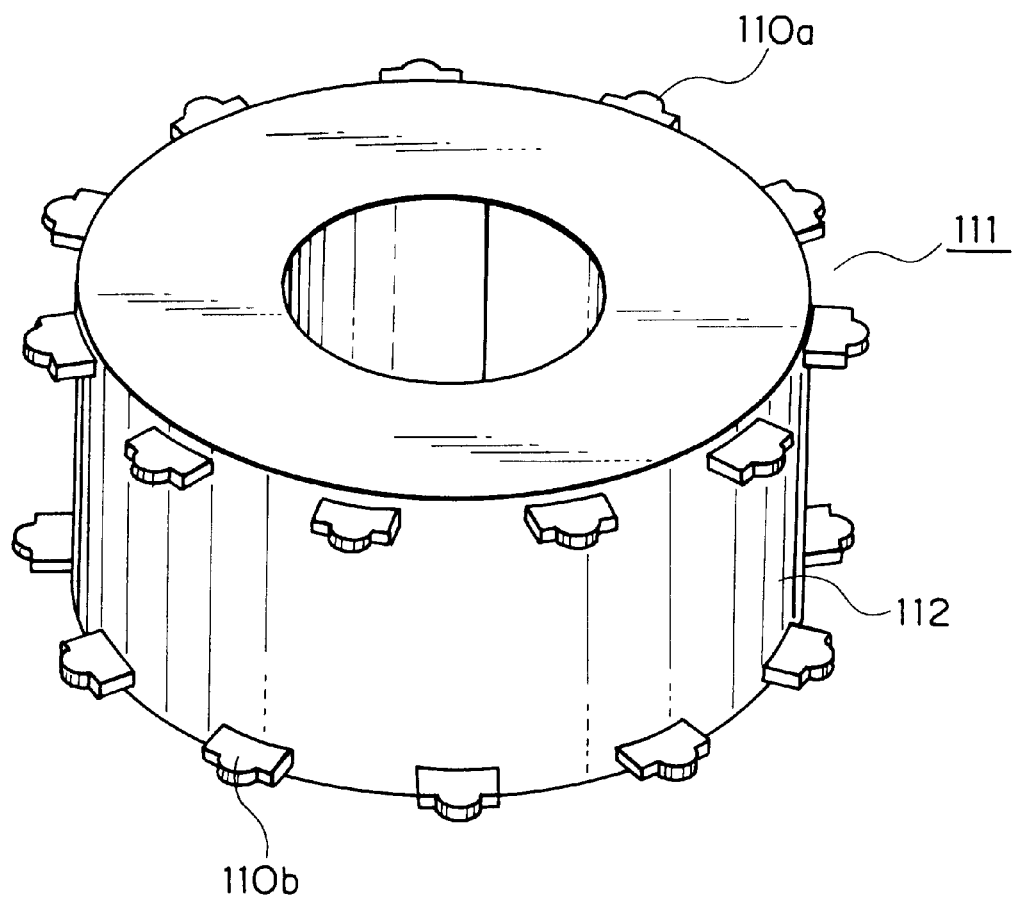
FIG. 25 is a perspective of an equalizer main body of the commutator according to Embodiment 9 of the present invention during manufacture.
Figure 26:
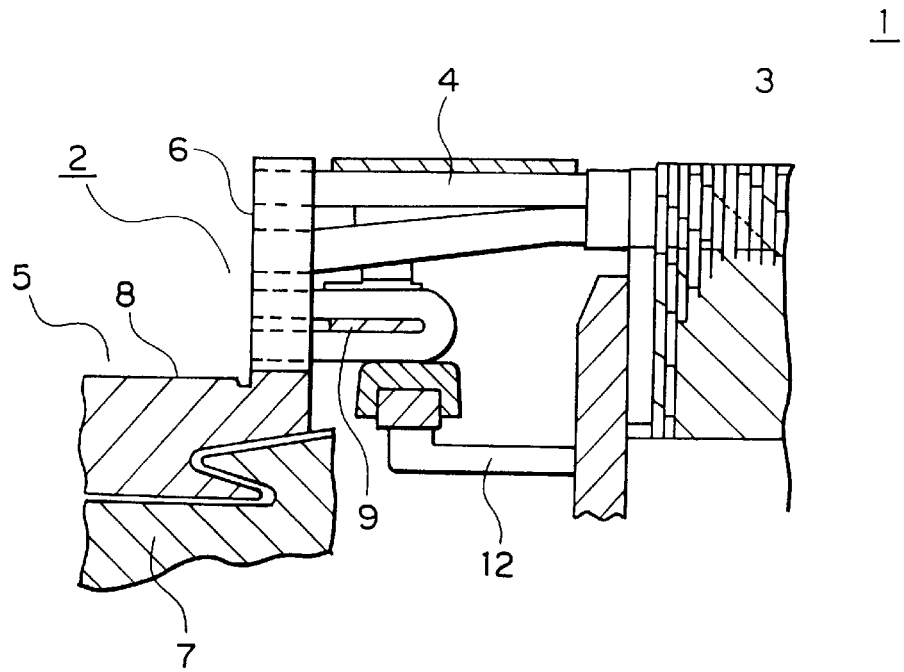
FIG. 26 is a partial cross-section of a conventional commutator.
Figure 27:
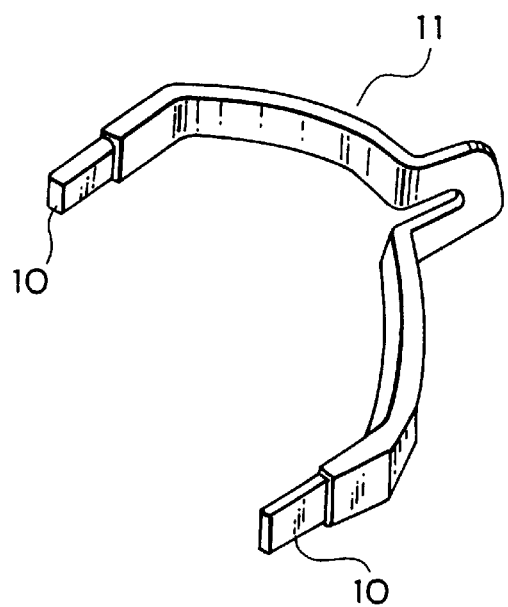
FIG. 27 is a perspective of an equalizer segment in FIG. 26.

FIG. 24 is a perspective of an equalizer segment 110 of a commutator according to Embodiment 9 of the present invention, and FIG. 25 is a perspective of an equalizer main body 111. In this embodiment, the equalizer segments run at an angle longitudinally along the inner wall of the commutator main body, and the height of protrusions 110a, 110b formed on both ends thereof is different. By assembling the equalizer segments 110 and integrating them by means of a premolded portion 112, it is possible to form an equalizer main body 111 having connecting portions between the commutator segments 41 and equalizer segments 110 set at two positions in the longitudinal direction of the commutator. This equalizer main body 111 is then inserted inside the cylindrical drum body 36, the space between the drum body 36 and the equalizer main body 111 is filled with insulating resin, and lastly the commutator segments 41 are formed by making longitudinal cuts with even pitch around the circumference of the drum body 36 to form the commutator.

In this embodiment, the equalizer segments 110 are easily positioned relative to the commutator segments 41. Furthermore, the amount of material used in the equalizers can be reduced. Furthermore, the equalizer assembly can be constructed by means of identically-shaped equalizer segments 110.

Moreover, the above embodiments have been explained with reference to a commutator for an electric motor, but the present invention can also be applied to a commutator for a generator.

As explained above, a commutator for a dynamo-electric machine according to one aspect of the present invention comprises: a cylindrical commutator main body provided with a plurality of commutator segments disposed around the circumference thereof; an equalizer assembly disposed inside the commutator main body provided with at least one equalizer segments electrically connecting commutator segments which are to have the same electric potential; and an insulating resin portion disposed within the space inside the commutator main body integrating the commutator main body and the equalizer assembly. Thus, the equalizer assembly is disposed inside the commutator main body, making the commutator assembly compact, and is secured firmly by means of the insulating resin portion, providing reliable electrical connection between commutator segments which are to have the same electric potential.

According to one form of the commutator for a dynamo-electric machine, the equalizer assembly may comprise a plurality of said equalizer segments. Therefore, a plurality of equalizer segments are disposed inside the commutator main body, making the commutator assembly more compact, and are secured firmly by means of the insulating resin portion, ensuring reliable electrical connection between commutator segments which are to have the same electric potential and preventing short-circuiting.

According to another form of the commutator for a dynamo-electric machine, the equalizer segments may be secured to the inner wall of the commutator segments by a securing means. Therefore, reliable electrical connection is ensured between the equalizer segments and the commutator segments.

According to still another form of the commutator for a dynamo-electric machine, the equalizer segments may be positioned circumferentially relative to the commutator segments by engaging engaging portions formed on the equalizer segments into engaged portions formed in the inner wall of the commutator segments. Therefore, the equalizer segments are reliably positioned circumferentially relative to the commutator segments, reliably preventing shortcircuiting between adjacent equalizer segments as well as improving the assembly operation.

According to another form of the commutator for a dynamo-electric machine, the commutator segments may be held by the equalizer segments by clasping clasped portions formed on the roots of the commutator segments in clasping portions formed on the equalizer segments. Therefore, the commutator segments are more reliably prevented from jumping out due to centrifugal force during rotation.

According to still another form of the commutator for a dynamo-electric machine, a predetermined spacing may be formed between each of the equalizer segments by forming grooves in the inner walls of each of the commutator segments each having a different depth from an end surface in the longitudinal direction and placing the equalizer segments in contact with the longitudinally bottom surfaces of the grooves. Therefore, predetermined spacing between each of the equalizer segments can be reliably ensured.

According to another form of the commutator for a dynamo-electric machine, spacers for ensuring spacing between adjacent equalizer segments may be disposed on the equalizer segments. Therefore, short-circuiting between adjacent equalizer segments or between equalizer segments and commutator segments other than the commutator segments to be connected is reliably prevented.

According to still another form of the commutator for a dynamo-electric machine, connecting portions between the commutator segments and the equalizer segments may be all at the same distance from the longitudinal end surfaces of the commutator segments. Therefore, the position for welding the commutator segments and the equalizer segments is regular, allowing the welding device to be simplified.

According to another form of the commutator for a dynamo-electric machine, the equalizer segments may be shaped so as to run at an angle longitudinally along the inner wall of the commutator main body. Thus, by assembling the equalizer segments, it is possible to form an equalizer assembly having connecting portions between the commutator segments and the equalizer segments set at two positions in the longitudinal direction of the commutator, enabling the amount of material used in the equalizer segments to be reduced and improving the connecting operation.

According to still another form of the commutator for a dynamo-electric machine, the equalizer segments may be composed of iron. Therefore, the equalizer segments are easily formed to a predetermined shape, reducing manufacturing costs, and it is possible to use a securing means such as laser welding, etc., improving the operation of securing the commutator segments and the equalizer segments.

Further, a method of manufacturing a commutator for a dynamo-electric machine according to another aspect of the-present invention comprises, a step of forming an equalizer main body by integrating a plurality of the equalizer segments in advance in a premolded portion composed of insulating resin, a step of inserting the equalizer main body inside a cylindrical drum body, a step of filling the space between the drum body and the equalizer main body with insulating resin, and a step of forming a plurality of commutator segments by making longitudinal cuts at an even pitch around the circumference of the drum body. Therefore, all of the commutator segments and all of the equalizer segments are positioned simultaneously, making positioning easy.

What is claimed is:

1. A commutator for a dynamo-electric machine comprising:
    a cylindrical commutator main body provided with a plurality of commutator segments disposed around the circumference thereof;
    an equalizer assembly disposed inside said commutator main body provided with at least one equalizer segment electrically connecting commutator segments which are to have the same electric potential; and
    an insulating resin portion disposed within a space inside said commutator main body integrating said commutator main body and said equalizer assembly.

2. The commutator for a dynamo-electric machine according to claim 1 wherein said equalizer assembly comprises a plurality of said equalizer segments.

3. The commutator for a dynamo-electric machine according to claim 2 wherein said equalizer segments are secured to an inner wall of said commutator segments by a securing means.

4. The commutator for a dynamo-electric machine according to claim 2 wherein said equalizer segments are positioned circumferentially relative to said commutator segments by engaging positioning members formed on said equalizer segments in receiving portions formed in an inner wall of said commutator segments.

5. The commutator for a dynamo-electric machine according to claim 2 wherein said commutator segments are held by said equalizer segments by gripping clasped portions formed on the roots of said commutator segments in receiving portions formed on said equalizer segments.

6. The commutator for a dynamo-electric machine according to claim 2 wherein a predetermined spacing is formed between each of said equalizer segments by forming grooves in inner walls of each of said commutator segments each having a different depth from an end surface in the longitudinal direction and placing said equalizer segments in contact with longitudinally bottom surfaces of said grooves.

7. The commutator for a dynamo-electric machine according to claim 2 wherein spacers for ensuring spacing between adjacent equalizer segments are disposed on said equalizer segments.

8. The commutator for a dynamo-electric machine according to claim 2 wherein connecting portions between said commutator segments and said equalizer segments are all at the same distance from longitudinal end surfaces of said commutator segments.

9. The commutator for a dynamo-electric machine according to claim 2 wherein said equalizer segments are shaped so as to run at an angle longitudinally along an inner wall of said commutator main body.

10. The commutator for a dynamo-electric machine according to claim 2 wherein said equalizer segments are composed of iron.

11. A method of manufacturing a commutator for a dynamo-electric machine comprising a cylindrical commutator main body provided with a plurality of commutator segments disposed around the circumference thereof, an equalizer assembly disposed inside said commutator main body provided with equalizer segments electrically connecting commutator segments which are to have the same electric potential, and an insulating resin portion disposed within a space inside said commutator main body integrating said commutator main body and said equalizer assembly,
    said method of manufacturing comprising:
    forming an equalizer main body by integrating a plurality of said equalizer segments in advance in a premolded portion composed of insulating resin;
    inserting said equalizer main body inside a cylindrical drum body;
    filling a space between said drum body and said equalizer main body with insulating resin; and
    forming a plurality of commutator segments by making longitudinal cuts at an even pitch around the circumference of said drum body.

* * * * *